INVENTOR.
Ellsworth W. Austin

Patented Oct. 3, 1933

1,928,778

UNITED STATES PATENT OFFICE 1,928,778

EARTH MOVER

Ellsworth W. Austin, Oakland, Calif., assignor to Knapp Manufacturing Corporation, Oakland, Calif., a corporation of California Application August 13, 1932. Serial No. 628,645

12 Claims. (Cl. 37—169)

My invention relates to machinery useful in conjunction with earth moving, excavating, grading and the like, and is especially concerned with an apparatus adapted to be propelled by a vehicle such as a tractor, and to be controlled by the operator of the tractor.

An object of my invention is to provide an earth mover of large capacity and correspondingly of considerable ruggedness.

Another object of my invention is to provide an earth mover in which the operating machinery is in an unobtrusive and protected position.

A further object of my invention is to provide an earth mover which is operable by mechanical or electrical power.

An additional object of my invention is to provide an earth mover which is tiltable about a longitudinal axis primarily for use in grading.

The foregoing and other objects are attained in the embodiment of the invention shown in the drawings, in which Figure 1 is a plan of one form of earth mover in accordance with my invention.

In its preferred form, the earth mover of my invention comprises a mold board to which a draft member is removably attached, and is provided with a truck mounted to pivot with respect to the mold board about a longitudinal axis and includes a ground engaging wheel frame pivotally mounted with regard to the mold board and having power operated means for varying the pivotal relationship between the ground engaging wheels and the mold board.

Figure 1:
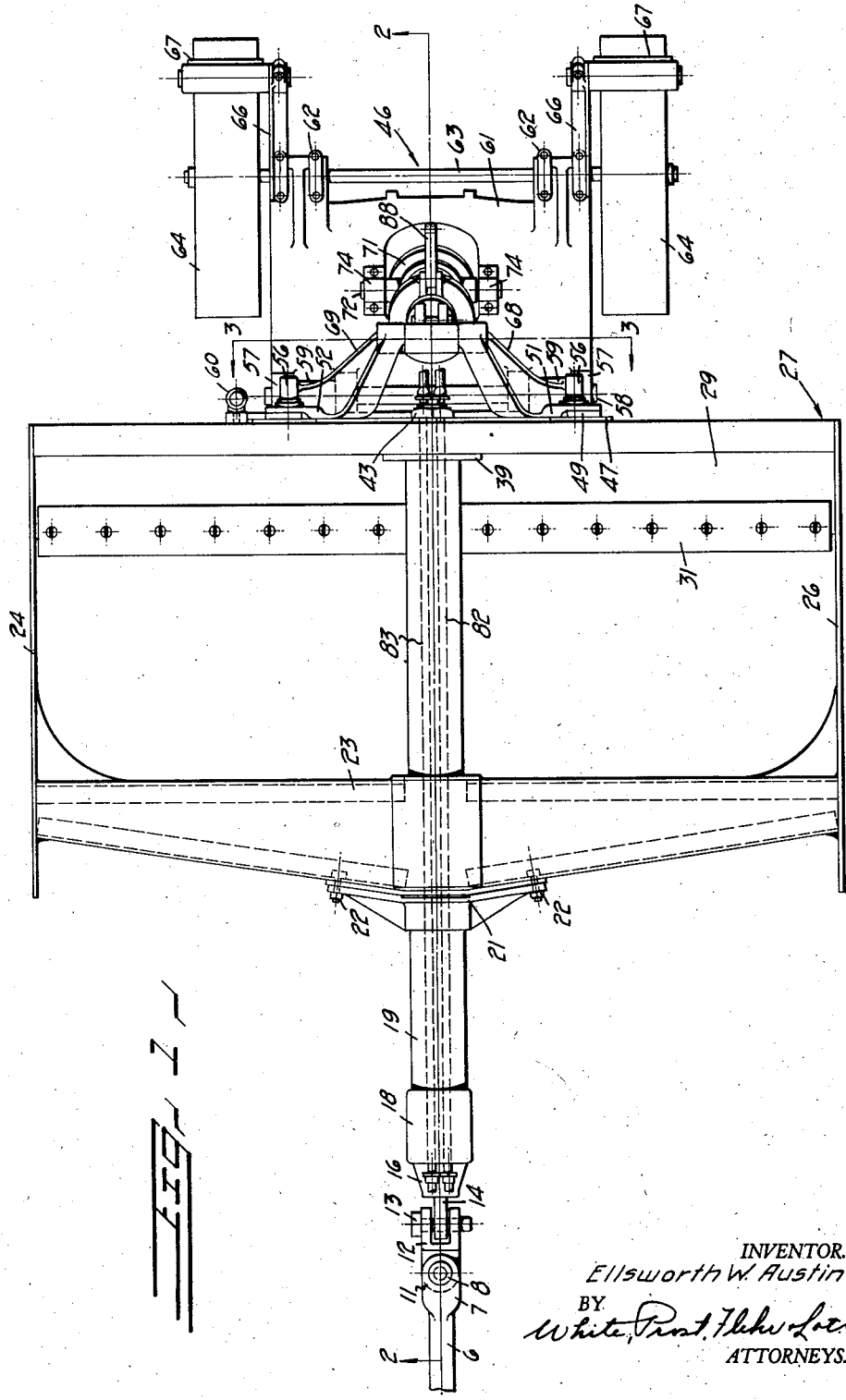
Figure 2:
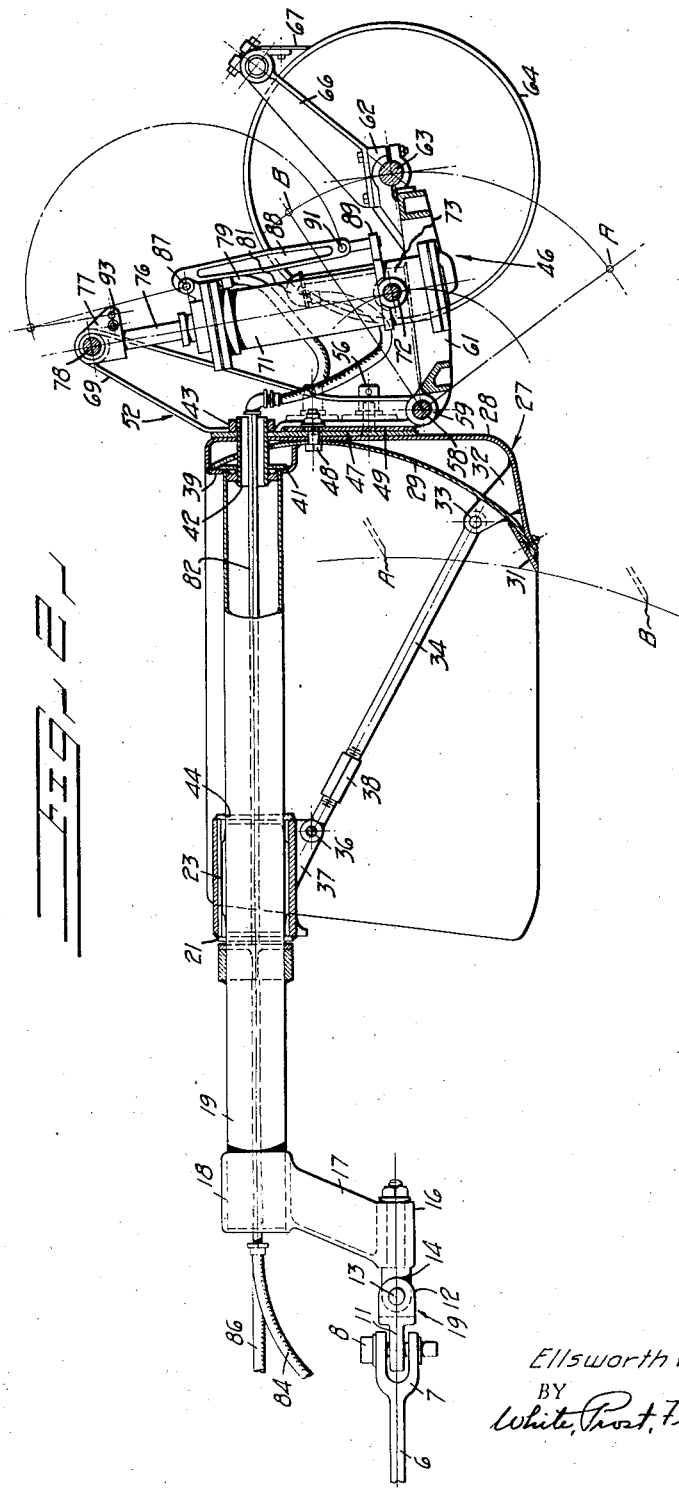
Figure 2 is a cross section, the plane of which is indicated by the line 2—2 of the Figure 1.
Figure 3:
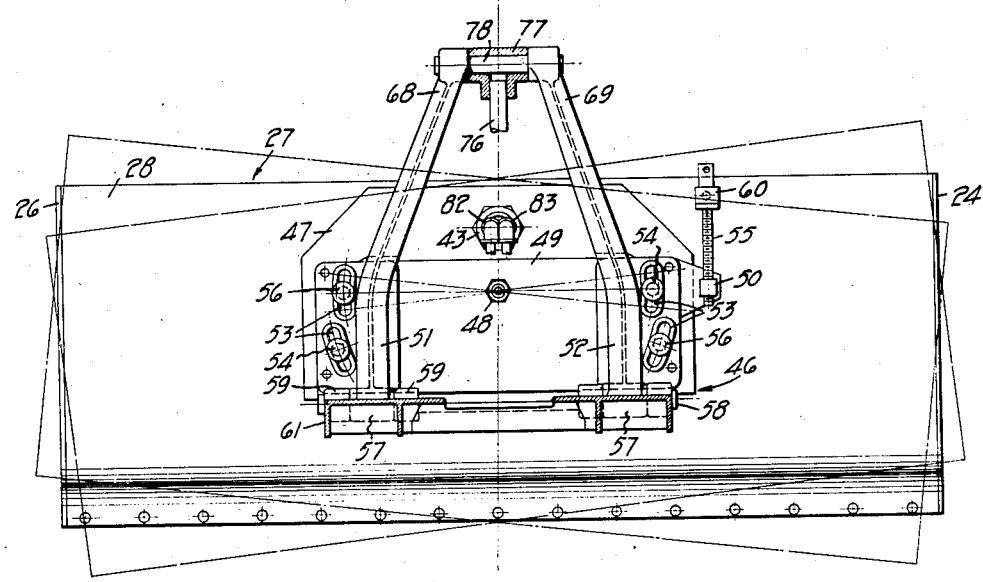
Figure 3 is a cross section, the plane of which is indicated by the line 3—3 of Figure 1.

In the form of the device shown in Figures 1 to 3 inclusive, there is disclosed a mechanism adapted to be actuated by a hydraulic displacement apparatus deriving its power from a pump unit mounted on a draft means such as a tractor, not shown. The tractor is provided with a draft hitch 6 comprising a bifurcated clevis 7 through which an attaching pin 8 is passed. The earth mover of my invention is designed to be fastened to the clevis 7 and includes a link 9 having a tongue 11 pierced by the pin 8 as well as ears 12 pierced by a pin 13, which passes through a swivel 14 confined in a depending, apertured boss 16 on an extension 17.

The extension 17 is part of a sleeve 18 which surrounds and is fastened to the forward end of a draft member 19. In this instance, the member 19 is preferably of tubular form, and is provided intermediate its ends with a saddle 21. This is secured by suitable fastening means 22 to the forward face of a built-up transverse beam 23 spanning a pair of parallel side plates 24 and 26, respectively, which in turn are joined to a mold board, generally designated 27. The side plates are preferably welded to the members of the beam 23, and are likewise welded to the members of the mold board 27.

The mold board generally is composed of a plurality of component parts, primarily a back plate 28 which is bent so that it is a channel in cross section, and a front plate 29 which is arcuate in cross section. In addition, the mold board terminates in a removable scraper blade 31 suitably secured to the forward edge of forward plate 29. Preferably, an anchor 32 is fastened to the back plate 28 and to the front plate 29, and is connected by a pin 33 to a stay rod 34 at its forward end fastened by a similar pin 36 to a depending lug 37 on the beam 23. A suitable turn buckle 38 affords an adjustment of the stay rod 34.

In order that the draft stresses may be transmitted not only through the beam 23 and the side plates 24 and 26 to the mold board 27, but may also be distributed to the central portion thereof, I preferably extend the tube 19 to a mold board boss 39 reinforced by a shoulder plate 41 against which the tube 19 abuts. The tube in addition carries an extension nipple 42 of somewhat smaller diameter which passes entirely through the mold board 27 and is held in place by a nut 43. Inasmuch as the diameter of the tube 19 aft of the saddle 21 is nowhere larger than the diameter of the aperture 44 in the beam 23, through which the tube passes, the tube can readily be emplaced and as easily withdrawn.

The mold board 27 preferably acts as a mounting for a truck, generally designated 46, which in turn serves as a supporting means for the mold board. Preferably, the rear plate 28 is provided with a reinforcement 47 welded thereto, both of which are pierced by a bolt 48 serving as a pivot for a plate 49 which joins a pair of brackets 51 and 52, respectively. The brackets are provided with elongated apertures 53 which are curved about the axis of the pivot 48 and receive suitable bolts 54 capped by nuts 56. When the nuts 56 are clamped, the brackets 51 and 52 are held in fixed relationship to the mold board 27 and the remainder of the mechanism, but when the nuts 56 are loosened the plate 49 can be rotated about the axis of the pivot 48, so that the brackets are located in any of their positions with respect to the mold board 27 and can be again clamped in any selected location with respect thereto.

As a convenient means of shifting the plate 49, I preferably pivot a threaded eye 50 in the plate 49. A screw shaft 55 threadedly engages the eye and is journalled against axial displacement in an eye 60 pivotally mounted in the plate 27. Rotation of the screw shaft 55 produces a corresponding shift of the plate 49.

At its lower extremity, each of the brackets 51 and 52 is provided with a boss 57 through which a common shaft 58 passes. Mounted on the shaft 58 are bosses 59 formed integrally with a frame 61 which is adapted to pivot about a transverse axis coincident with the axis of the shaft 58. At its trailing edge the frame 61 is provided with bosses 62, each of which receives a shaft 63 serving as an axle for an associated ground engaging wheel 64. Preferably mounted on the frame 61 adjacent each of the wheels 64 are support arms 66 each carrying a scraper 67 for removing adhering material from the periphery of the adjacent wheel 64.

In order to relate the wheels 64 with regard to the mold board 27, and in order to maintain the frame 61 in desired relationship to the mold board 27, I preferably provide a suitable displaceable mechanism between the frame 61 and extensions 68 and 69 on the brackets 51 and 52. In Figure 2 is disclosed a hydraulically actuated piston and cylinder arrangement. This includes a cylinder 71 provided adjacent its base with oppositely extending pins 72 received in trunnion blocks 73 on the frame 61, and held in location by caps 74 on the blocks. Thus the cylinder is mounted for oscillation on the frame 61 and can be easily removed by removal of the caps 74. Extending from the upper end of the cylinder is a piston rod 76 which is connected to a piston (not shown) within the cylinder. The rod 76 is provided with a head 77 pivotally mounted on a pin 78 fastened in the upper ends of the extensions 68 and 69.

The cylinder 71 is supplied with hydraulic fluid under pressure through a pair of conduits 79 extending to one end of the cylinder and 81 extending to the opposite end of the cylinder. These conduits are preferably flexible, and are connected to pipes 82 and 83 extending through the hollow tube 19 and being thereby protected from external injury. As they emerge from the forward end of the tube 19, the pipes 82 and 83 are connected to additional flexible conduits 84 and 86 which extend to a suitable hydraulic pumping arrangement on the tractor, not shown, and preferably being controlled by the operator thereof. Since the quantity of hydraulic fluid in the opposite ends of the cylinder 71 can be controlled by an operator, the displaceable mechanism varies at will the spacing between the upper pin 78 and the trunnion pins 72, so that the frame 61 is rocked about the axis of the shaft 58, thereby raising and lowering the mold board 27 with respect to the ground between the extreme positions indicated at A and B.

For adapting the mechanism for transportation, under which condition it is usually desirable to break the hydraulic connections, I preferably pivotally mount on the cylinder 71 by a pivot 87, a lever 88 which is normally held in depending position by a clip 89 on the lower end of the cylinder 71. The lever is pierced by an aperture 91 which, when the lever is disengaged from the clip and is swung through a semi-circle, is adapted to rest in alignment with an aperture 93 formed in the head 77. A pin passed through the then aligned apertures maintains a fixed relative location between the piston and cylinder without depending upon hydraulic pressure.

Figure 4:
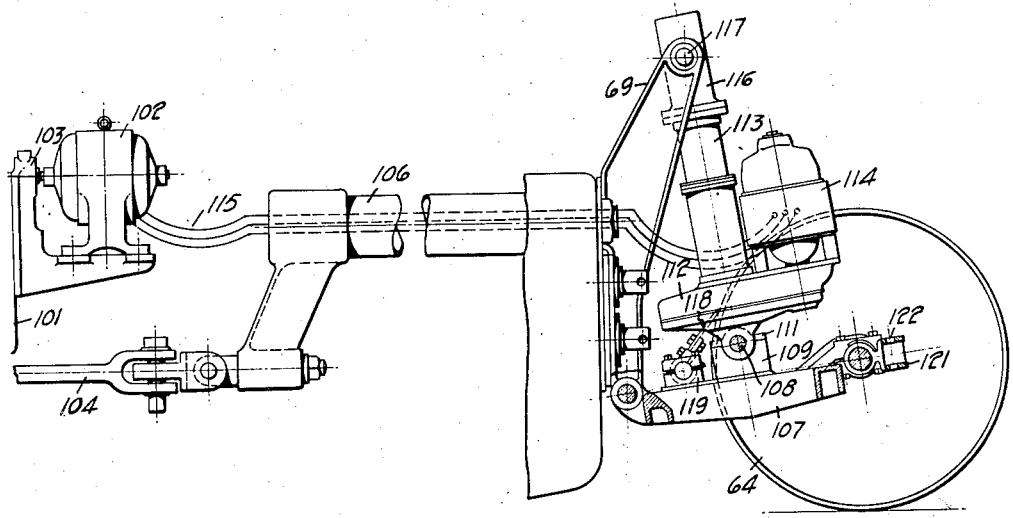
Figure 4 is a side elevation, somewhat similar to Figure 2 with portions removed to reduce the size of the figure, showing a modified form of power driving mechanism.

Under certain conditions of operation it is desirable to substitute for the hydraulic system a system utilizing electricity, and under such conditions I preferably provide the mechanism illustrated in Figure 4. Therein the tractor 101 is provided with an electric generator 102 driven through the customary power takeoff mechanism 103 of the tractor. The tractor is also equipped with a drawbar 104 in the customary fashion, which is connected to the draft member 106 of my earth mover, which, in the main, is as previously described. The frame 107, however, instead of carrying a hydraulically displaceable mechanism, is provided with an electrically displaceable mechanism. This mechanism includes a through pin 108 adapted to be seated in trunnion blocks 109 on the frame 107 and to be held in place by suitable caps 111. The trunnion pins extend from a casing 112 which houses a gear reduction connecting an electric motor 114 to a screw shaft, not shown. The motor 114 is supplied with electricity by suitable electrical conduits 115, preferably extending through the tube 106 to the generator 102 and is preferably under the control of the tractor operator. The screw within the casing 113 is effective to displace a member 116 carrying trunnion pins 117 which are received in the upper extremities of the brackets 68 and 69.

Preferably the critical dimensions of the mechanism shown in Figure 4 are identical with the corresponding dimensions of the mechanism shown in Figure 2, so that a hydraulic mechanism for instance can easily be removed by removing the trunnion pin caps 74 and the pin 78, and can be replaced with an electrically driven mechanism, and vice versa. In the mechanism of Figure 4, there are provided scrapers 118 mounted in suitable supports 119 secured to the forward portion of the frame 107 in advance of the ground engaging wheels 64. Also, there is provided a socket 121 carrying apertures 122 for a fastening pin to act as a draft attachment for any trailing mechanism desired.

It is to be understood that I do not limit myself to the form of earth mover shown and described herein, as the invention as set forth in the following claims may be embodied in a plurality of forms.

I claim:

1. An earth mover comprising a mold board, side plates joined to the ends of said mold board, a beam spanning said side plates, and a draft tube extending from said mold board through and beyond said beam.

2. An earth mover comprising a mold board, side plates on said mold board, a beam spanning said side plates, and a draft member secured to said mold board and to said beam.

3. An earth mover comprising a mold board, side plates on said mold board, a beam spanning said side plates, and a draft tube passing through an aperture in said beam and removably fastened to said mold board and said beam, said tube being withdrawable through said aperture.

4. An earth mover comprising a mold board, a draft member secured to said mold board, brackets secured to said mold board, a frame pivoted on said brackets, ground engaging wheels on said frame, and a displaceable means pivoted to said brackets and to said frame.

5. An earth mover comprising a mold board, a draft member secured to said mold board, brackets mounted to pivot as a unit on said mold board, a frame pivoted on said brackets and carrying ground engaging members, and displaceable means pivoted to said brackets and to said frame for pivotally moving said frame with respect to said brackets.

6. An earth mover comprising a mold board, side plates on said mold board, a beam spanning said side plates, a draft member secured to said beam and to said mold board, brackets secured to said mold board, a frame pivotally mounted on said mold board, ground engaging wheels on said frame, and displaceable means engaging said brackets and said frame for moving said frame with respect to said brackets.

7. An earth mover comprising a mold board, a truck mounted to pivot on said mold board about an axis substantially perpendicular to said mold board, said truck including ground engaging wheels and means for vertically displacing said wheels with respect to said mold board.

8. An earth mover comprising a mold board, brackets movable on said mold board in paths circular about a common center, means for clamping said brackets against movement, ground engaging members movably supported by said brackets, and means for holding said members against movement.

9. An earth mover comprising a draft member, earth confining means secured to said draft member, a frame pivotal about two axes at right angles to each other with respect to said earth confining means, and ground engaging members on said frame.

10. An earth mover comprising a mold board, a truck mounted to pivot on said mold board about an axis substantially perpendicular to said mold board, ground engaging wheels on said truck, and means for pivotally moving said truck with respect to said mold board.

11. An earth mover comprising a draft member, a mold board connected to said draft member, ground engaging members movably mounted with respect to said draft member, and a power actuating mechanism entirely located behind said mold board and the weight of which is substantially entirely carried by said ground engaging members for moving said ground engaging members with respect to said draft member.

12. An earth mover comprising a hollow draft member, an earth handling member connected to said draft member, ground engaging members movably mounted with respect to said draft member, a power actuating mechanism mounted adjacent said ground engaging members for moving said members with respect to said draft member, and power conductors extending through said hollow draft member to said power actuating mechanism.

ELLSWORTH W. AUSTIN.